(12) United States Patent
Verstrynge

(10) Patent No.: US 7,721,221 B2
(45) Date of Patent: May 18, 2010

(54) TASK MANAGER

(75) Inventor: Jérôme Verstrynge, Amsterdam (NL)

(73) Assignee: DawningStreams, Inc., Hasbrouck Heights, NJ (US)

( * ) Notice: Subject to any disclaimer, the term of this patent is extended or adjusted under 35 U.S.C. 154(b) by 237 days.

(21) Appl. No.: 11/550,054

(22) Filed: Oct. 17, 2006

(65) Prior Publication Data

US 2008/0168362 A1 Jul. 10, 2008

(51) Int. Cl.
*G06F 3/048* (2006.01)
(52) U.S. Cl. .......................................... 715/771; 705/9
(58) Field of Classification Search ................ 715/762, 715/771, 763, 71, 772
See application file for complete search history.

(56) References Cited

U.S. PATENT DOCUMENTS

2007/0005618 A1* 1/2007 Ivanov et al. ............... 707/100
2007/0067425 A1* 3/2007 McKinney .................. 709/223
2007/0198968 A1* 8/2007 Shenfield et al. ............ 717/104

* cited by examiner

*Primary Examiner*—Thanh T Vu
(74) *Attorney, Agent, or Firm*—Foley Hoag LLP

(57) ABSTRACT

A computer system is configured as a task manager that provides interfaces both for designing an abstract activity and for defining a concrete instantiation of such an activity by replacing the abstract activity's abstract information with concrete information. In executing concrete instantiations of the abstract activities thus defined the task manager sends users prompts that cause them to take actions such as providing the task manager information that it uses to define the concrete instantiation further.

27 Claims, 6 Drawing Sheets

TASK MANAGER

BACKGROUND OF THE INVENTION

1. Field of the Invention

This disclosure relates to creating systems and methods for managing one or more repetitive activities.

2. Background Information

Software tools have been developed for managing certain activities, such as hiring an employee, filing a tax return, etc., that involve repetitive tasks. For example, TurboTax™ developed by Intuit, Inc., is a financial and tax-preparation tool designed to manage the various repetitive tasks associated with filing a tax return.

A software tool of this type provides one or more pre-designed templates for a particular activity (e.g., filing a tax return). A user interacts with the program by providing personal information that is specific to his situation. The software then processes the personal information and implements the activities in accordance with the user's needs. Software of this type has made performing such tasks faster and easier.

SUMMARY OF THE INVENTION

We have identified a way to improve such products: a single tool that enables the user not only to provide the situation-specific information elicited by a template but also to create the template itself. The user of such a tool is no longer dependent on the marketplace to provide a software solution for an activity that has many repetitive tasks. The user can use the tool both to design the template and to execute an activity based on it.

BRIEF DESCRIPTION OF THE DRAWINGS

The invention description below refers to the accompanying drawings, of which.

DETAILED DESCRIPTION

Figure 1:
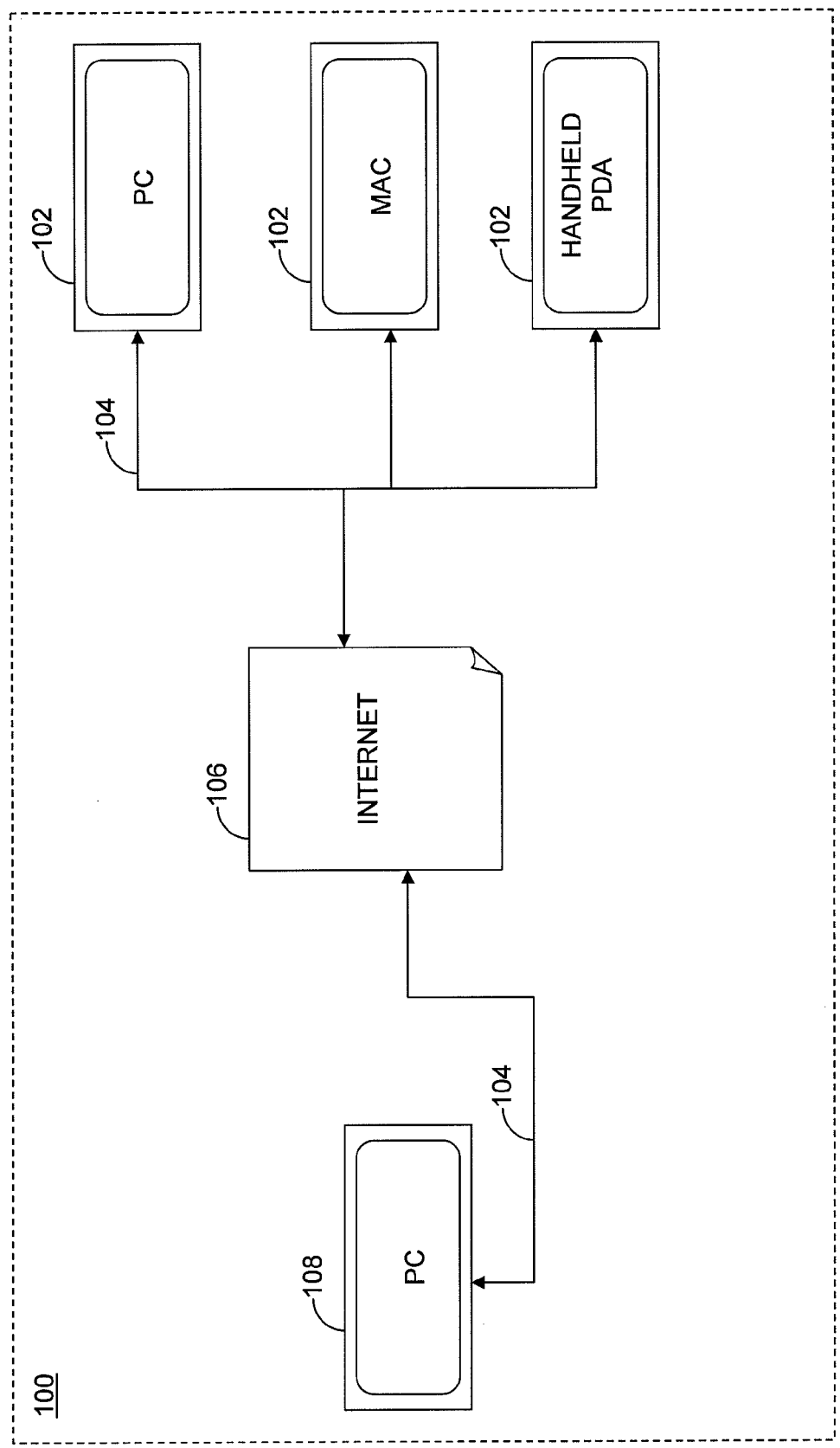
FIG. 1 is a diagram of a computer network that provides one of the types of environments in which the present invention's teachings may be practiced.

The present invention's teachings are applicable to a wide range of computer systems. But we will assume for the sake of concreteness that it is being implemented in a system of the type depicted in FIG. 1, where a plurality of computing devices 102 are networked with each other and each computing device communicates over one or more communications links 104 to a network 106. Although not shown, a computing device 102 typically includes among its usual components a microprocessor, a RAM, and persistent storage, such as a local disk drive, interconnected by a bus. For the sake of simplicity, we will assume that the disk drive not only contains program code that configures the computing device 102 to perform the steps described below but also stores data that pertain to one or more abstract activities (which will be defined below). Such program code may have been loaded onto the disk from a removable storage device or through a communications interface from some remote source. The data may have been obtained similarly.

Possibly in response to commands entered from, for example, a keyboard, the system performs any number of functions, including, for example, delivering a prompt to a recipient of an assigned task. A prompt is an electronic message that contains either a command for performing a specific task (e.g., "obtain a work permit") or a query for eliciting specific information (e.g., "provide a social security number"). The recipient is an entity that is responsible for performing a task or providing information in response to this prompt. The system also receives the responses from the recipients and evaluates such responses. If necessary, the system will adjust subsequent prompts' sequences in accordance with responses.

Some embodiments may use XML files to transfer both the prompts to and responses from the recipients. The XML file advantageously provides a text-based means to describe and to apply a tree-based structure to data information. As a result, the XML file facilitates the exchange of information between different computers using different technologies.

Aspects of this present invention may find particular application in peer-to-peer systems, wherein all of the computer devices 102, or "nodes," is treated as equals on the network 106. Most of the activities described below will take place on a single node, which we will call the "host node" 108. However, any one of the other nodes on the system can be similarly used as a host node. The other, non-host nodes will be referred to as "peer nodes."

The description below uses an employee-hiring example to illustrate the invention's teachings, but the invention is not limited to this particular subject matter; the system may be used to create and execute, respectively, any abstract and concrete activities.

Generally, an activity is made up of one or more tasks. A task is a command that instructs a user to perform a desired action. Where more than one task exists for an activity, the tasks may be interrelated by "relationships." A "relationship" determines the sequence in which the tasks are performed. Some tasks, however, are not interrelated by any relationships. In such instances, the tasks are executed in any order.

Activities are categorized into concrete activities and abstract activities. A concrete activity is a specific instance of an abstract activity. As will be seen below, a concrete activity is an activity that results from replacing the abstract activity's abstract information with concrete information.

Figure 2:
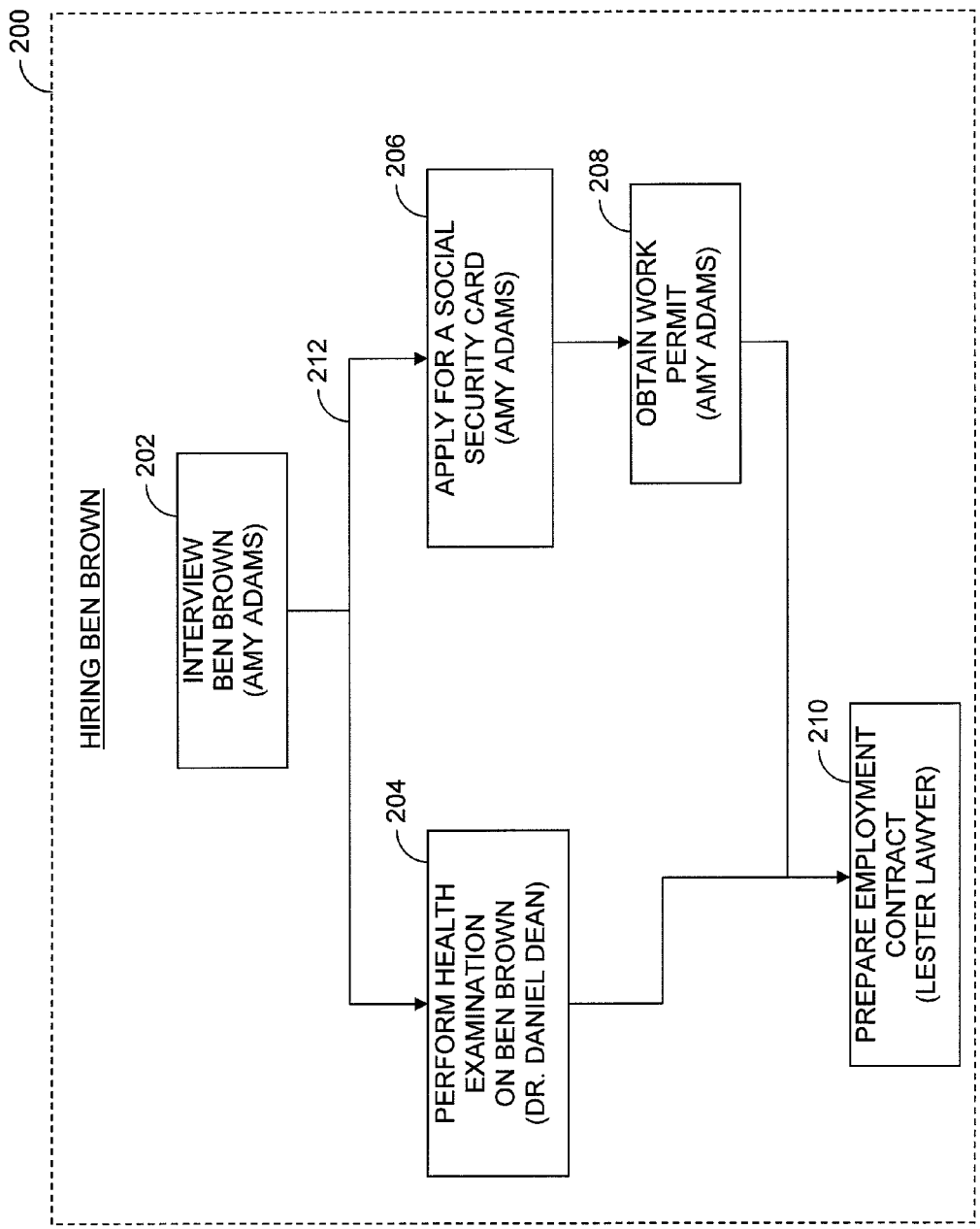
FIG. 2 is a flow chart of a concrete activity.

FIG. 2 depicts an example concrete activity: Acme Corporation's hiring of a new employee named Ben Brown. As will be seen below in connection with FIG. 3, concrete activity 200 is a instantiation of the abstract activity of hiring an employee generally.

To perform concrete activity 200, Acme Corporation must execute a number of concrete tasks 202-210. In the illustrated embodiment, these concrete tasks include, for example, interviewing Ben Brown (202), performing a health examination on Ben Brown (204), applying for a social security card (206), obtaining a working permit (208), and preparing an employment contract (210).

Each concrete task is performed according to a specific order determined by the relationships 212. For example, the concrete task of "interviewing Ben Brown" (202) must be performed before all the other tasks 204-210. Likewise, the concrete task for "applying for a social-security card" (206) precedes the concrete task for "obtaining a work permit" (208), since a social-security number is required for all work-permit applications. The relationships 212 dictate this order of performance.

Furthermore, each concrete task is associated with a recipient (not shown) who is to be prompted to perform the concrete task or provide requested information. The system identifies the recipient and sends a prompt to this identified recipient. Concrete activity 200 is completed when all the concrete tasks 202-210 have been performed.

Figure 3:
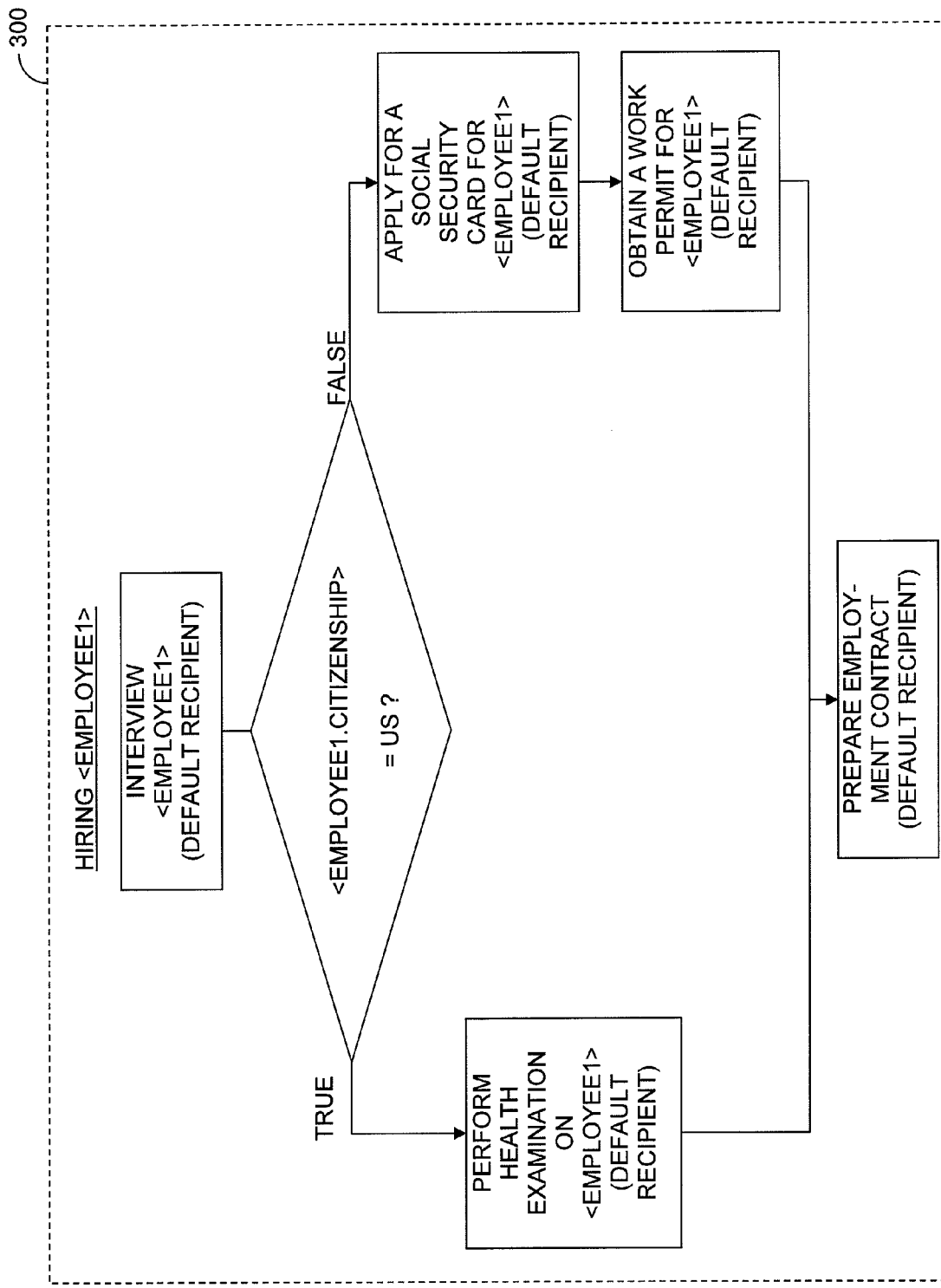
FIG. 3 depicts a corresponding abstract activity.

Now, suppose Acme Corporation wants to create a generic template for the hiring process so that this generic template can be used in hiring future employees. FIG. 3 illustrates an example of a generic template for hiring an employee. More specifically, FIG. 3 illustrates an abstracted version of the concrete activity described in FIG. 2 for hiring Ben Brown.

Acme can accomplish the task of creating an abstract-activity template in several ways. One way involves modifying a pre-existing abstract activity in order to generate a new abstract activity. The pre-existing abstract activity may have been previously defined by the user who is creating the new activity, or by some other user, and stored in the system's memory. The details for modifying a pre-existing abstract activity will be discussed later on. Another way involves creating an abstract activity entirely from scratch. To do so, the user designs the abstract activity (and its corresponding abstract tasks, information, relationships, etc.) by using an abstract interface, as discussed in FIG. 4 (below). Still another way involves using a concrete activity (such as the one described in FIG. 2) and replacing some of its concrete information with abstract information. In the concrete task "hire Ben Brown," for example, replacing the concrete information "Ben Brown" with the abstract information "<employee1>" results in the abstract task "hire <employee1>."

Figure 4:
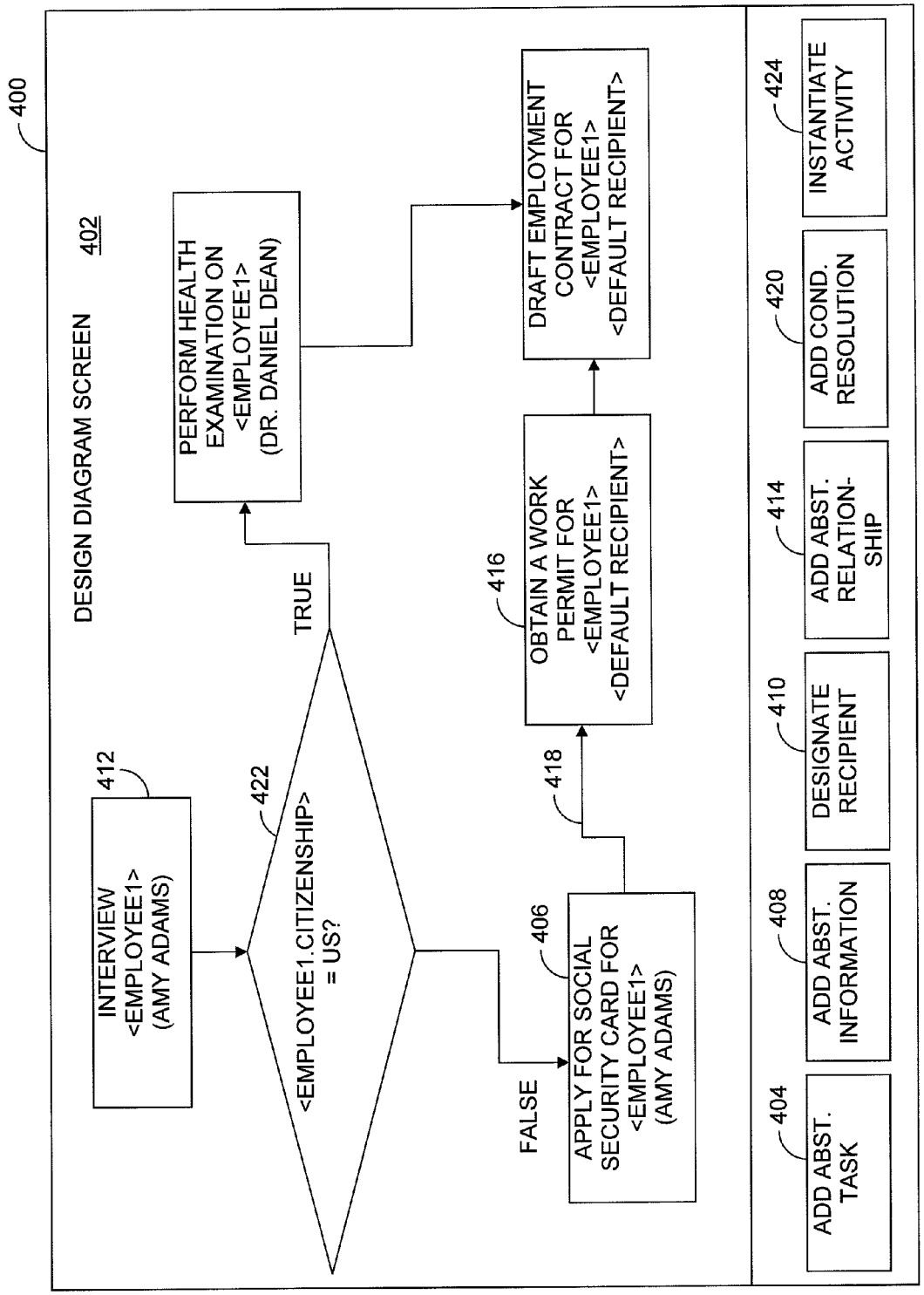
FIG. 4 depicts an exemplary embodiment of an abstract-design interface.

FIG. 4 illustrates an exemplary embodiment of an abstract interface 400 that a user can employ to design an abstract activity from a pre-existing concrete activity or from scratch.

In the latter case, the abstract-design interface 400's design area 402 is initially blank. In that blank space, the user can insert abstract tasks, create relationships among the abstract tasks, define the abstract-information objects, and, as will be explained below, assign "conditional resolutions." In the illustrated embodiment, the user may employ an input device, such as a keyboard, a mouse, and/or a pointer, in order to, say, enter text, move on-screen objects around, click on them, etc.

The abstract-design interface 400 may also include one or more buttons associated with respective specific actions to be performed. In the illustrated embodiment, for example, the abstract-design interface 400 includes a button 404 associated with adding an abstract task into the design area 402. If a user clicks on the "add abstract task" button 404, then a blank text box appears in the design area 402. The user may enter the text of a command entry into the blank box to create a command-containing box such as box 406. The command entry represents the substantive portion of a prompt that the system will deliver to a recipient during the concrete-instantiation phase. An example of a command entry is "perform health examination on <employee1>," where the angle-bracketed term "<employee1>" represents abstract information for which concrete information will later be substituted.

Whereas the remainder of the text in the command entry represents fixed content (i.e., content that will appear in the corresponding prompt whenever a concrete instantiation of the task is executed), the angle-bracketed term "<employee1>" will be replaced during each instantiation in accordance with concrete information specific to that particular instantiation: replacement values can vary from instantiation to instantiation of the same abstract task. We therefore refer to "<employee1>" as "abstract information."

To enter abstract information into an abstract task's definition, the user may simply type in, say, angle brackets around an identifier (e.g., "<employee1>") to indicate that what he is entering is abstract information. Let us assume that the illustrated embodiment treats such an entry, with nothing more, as calling for that abstract information to be replaced with a text string, e.g., "Ben Brown," to create a concrete task based on that abstract one.

But the illustrated embodiment additionally provides the user the ability to specify data types other than simple text strings as sources for the replacement values, and it provides button 408 for this purpose. Clicking on that button while an abstract-information item is highlighted produces a drop-down list (not shown in the drawings) of built-in and/or previously defined data types. Selecting one of the list's entries specifies the highlighted item's data type, as will be explained in more detail below.

Figure 5:
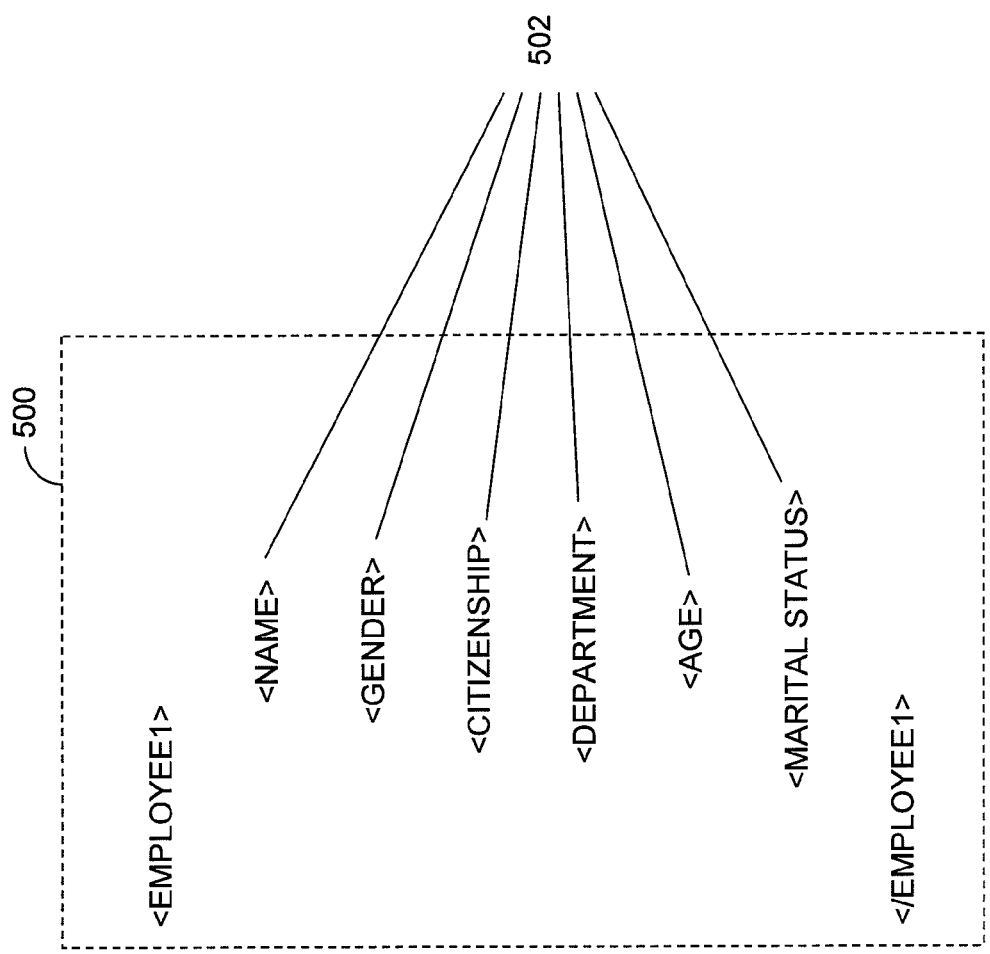
FIG. 5 illustrates an exemplary form of data-type definition.

The drop-down list may additionally enable the user not only to select an existing data type but also to add a new one. Let us suppose that the user selects that option, i.e., that he wants to define a new data type, which he will call, say, "employee." The user's selection of that option results in the system's presenting him with a blank screen, in which the user can use entries of, say, the type that FIG. 5 depicts to define the new data type. FIG. 5 depicts an instance wherein a user has defined the "employee" data type as including the following attributes 502: name, gender, citizenship, department, age, and marital status. Defining a new data type can be thought of as a creating a new table in the database, one that is called "employee." This new table has a column for each attribute, and it has a new row added each time a user adds a concrete object of that data type. For example, each of the listed attributes (e.g., age, gender, etc.) in FIG. 5 represents a column in the table named "employee." Furthermore, the concrete object "Ben Brown" would represent a row in the table named "employee," and each column in that row would contain Ben Brown's value of the attribute associated with that column.

By specifying that "employee1" is of the "employee" data type, the user indicates that making a concrete instantiation of FIG. 4's abstract activity includes replacing every occurrence of "<employee1>" in the abstract activity with information from the same row of the "employee" table. If a user who is instantiating that activity indicates that "employee1" will represent a row containing the data for a thirty-two-year-old married male employee named Ben Brown, for example, any occurrence of "<employee1.age>" will be replaced with "32," i.e., with the contents of that row's age-column entry. In some embodiments, the user may be given the option of designating one of the attributes as the default attribute. If the default attribute is "name," for example, the user can employ simply "<employee1>" rather than "<employee1.name>" to call for replacement by the selected object's name attribute. The user also may be given the option of designating one attribute or a combination of attributes as the table's key; a value of that attribute or combination thereof can serve as a unique identifier of the object (table row), and the system's database-management software will enforce that uniqueness.

Note that FIG. 4's task-representing boxes use parentheses, as FIG. 2 does, to designate the recipients and that in three of those boxes the abstract-activity designer has entered specific recipients (Amy Adams and Daniel Dean). That is, the user has entered concrete information. However, these are default values; the concrete-activity designer can change them when he instantiates the abstract activity, or he can take no action and leave the recipient as the one that the abstract-activity designer specified. In the other two task-representing boxes, the user has entered no value: those boxes say "(Default Recipient)," and the concrete-activity designer will have to specify a recipient affirmatively.

To enable the abstract-activity designer to specify a default recipient, the system provides the user with button 410. Clicking on that button while a command-containing box, such as box 406, is highlighted produces a form in which the user can enter attribute values for a new object of the "recipient" type. Generally, such recipient objects 412 include at least two attributes: the recipient's name or identifier and the recipient's preferred communications medium for receiving a prompt (e.g., e-mail, telephone, etc.). In other embodiments, a drop-down list (not shown) rather than a blank form appears in the design area 402 when the user clicks on button 412. The drop-down list may include a list of past recipients assigned by the system for a particular task. Each of the list's pre-existing recipients has attribute values that were previously defined from past use(s). The drop-down list also may include recipients that the user previously defined without having used them in previous instantiations.

In the illustrated example, the prompts for different concrete tasks can be sent to different recipients. For example, the prompt for "obtain social security card for Ben Brown" is sent to a recipient in Acme's human-resources department, whereas the prompt for "draft employment contract for Ben Brown" is to an attorney in the legal department. In some cases, though, all of the prompts may be sent to the same recipient.

The illustrated embodiment also enables the user to determine the order in which each of the tasks is performed. For this purpose, it provides button 414, which allows the user to establish "relationships" between various abstract tasks. As described above, a "relationship" indicates an order of performance for some or all of the abstract tasks. However, a relationship is entirely optional: some abstract activities have no relationship because the order of performance is irrelevant. In such instances, the system may send all of the prompts to the designated recipients simultaneously.

Clicking on button 414 while a command-containing box, such as box 406, is highlighted produces an arrow that emanates from that box. That arrow initially is "unlocked," which means that the user must click on a second command-containing box, say, box 416, in order to "lock" the arrow (or secure the connections) between the two boxes 406 and 416 so that the arrow leads from one to the other, as FIG. 4's arrow 418 does. By locking arrow 418 between the two boxes 406 and 416, the user has established a relationship between them. Specifically, the task associated with the box from which arrow 418 originates must be performed before the task associated with the box at which that arrow terminates.

The illustrated embodiment also provides the user the ability to assign a conditional operator, such as an "if/then" operator, to an abstract task. These conditional operators are called "conditional resolutions" and are evaluated in accordance to certain pre-defined parameters or return values. The conditional resolutions affect an abstract activity in a number of ways. A conditional resolution may determine, for example, whether to include one or more additional abstract tasks to the abstract activity. For example, a conditional resolution may inquire whether a hired employee is a United States citizen. If the return value for this conditional resolution is "false" (i.e., the employee is not a U.S. citizen), then the rules of the conditional resolution may require the system to include an additional abstract task of "apply for a work permit" to the abstract activity. The conditional resolution may also be assigned to the recipient object of an abstract activity. For example, a conditional resolution may be used to determine whether an employee is male or female in order to decide whether to send the prompt for "performing a health examination" to a male or female doctor-recipient.

In the illustrated embodiment, the user generates a conditional resolution by clicking on a button 420. Doing so causes a blank text box to appear in the design area 402. The user may enter the text of a conditional operator into the blank box to create a conditional resolution, such as the one that box 422 represents. Using the steps described above for creating relationships, the user specifies the codes that depend on the conditional resolution. In the illustrated embodiment, the conditional resolution has a binary (i.e., true or false) outcome, so the user would create two relationship arrows that emanate from box 422 to reflect those two values.

Conditional resolutions may also affect the relationship between two abstract tasks. In an abstract activity for cooking chicken, for example, a conditional resolution may be associated with the abstract-information objects "<main ingredient>" and "<secondary ingredient>." Specifically, the timing of when to cook each ingredient depends on the actual ingredient provided. For example, if the secondary ingredient is a starch-based vegetable, such as a potato, then the conditional resolution may require the abstract task for "cooking the <secondary ingredient>" to be performed before the abstract task for "cooking the <main ingredient>." Conversely, if the secondary ingredient is a non-starch vegetable, such as a tomato, then the conditional resolution may require the abstract task for "cooking the <secondary ingredient>" to be performed after the abstract task for "cooking the <main ingredient>." And a conditional resolution may determine whether there is any relationship at all between two tasks.

In addition, a conditional resolution need not always be associated with an abstract information object or an abstract task; it may instead depend on some internal information monitored by the system, such as an internal clock or calendar. For example, a conditional resolution may require that an abstract activity's performance depend on the time of day (e.g., morning vs. afternoon).

Once the user has finished designing the abstract activity, the illustrated embodiment enables the user to place the abstract activity in the system's persistent storage. If the user tells the system (through an interface not shown) that it should save that activity, the system will prompt the user to assign that activity a name (e.g., "Hire Employee for Acme Corporation"). After the user saves this new abstract activity to the system, the new abstract activity will be accessible to that user as well as to users located on other, peer nodes. Moreover, the new abstract activity will appear on a list of pre-existing abstract activities, and it may be selected by a user for future modifications.

As mentioned earlier, a user does not always design an abstract activity from scratch; he also can modify a pre-existing abstract activity. When the user logs into the system, he is presented a pull-down menu from which he can select whether to create the abstract activity from scratch or modify a pre-existing abstract activity. The pull-down menu generally comprises a list from which the user can select an operation that the system is to perform, such as "modify pre-existing abstract activity."

If the user selects the option of modifying a pre-designed abstract activity, then he is presented a list of pre-existing abstract activities. These pre-existing abstract activities are all abstract activities that the abstract-activity-creating user or other users on the system have previously designed. After the user selects a specific pre-existing abstract activity, the system presents the user an abstract interface, similar to the one that FIG. 4 illustrates, in which the design area 402 is prefilled with the abstract tasks, relationships, and conditional resolutions associated with the selected abstract activity.

The user may create this new abstract activity from the selected one by modifying the various elements. For example, the abstract-design interface 400 may be arranged to respond to the user's double-clicking on one of the blocks by presenting the user a list of actions that can be taken on the text box, such as removing it, revising the fixed or abstract-information part of its legend, and moving the text box to another location in the design area 402. Additionally, the user also may add further abstract tasks, relationships, and conditional resolutions to the abstract activity. The user does this by performing steps similar to those described in FIG. 4. Note that adding and subtracting elements does not change the previous abstract activity on which the new one is based; it affects the newly designed activity only.

As described above, once the user has finished modifying the selected abstract activity, he may assign a name and place the new abstract activity in the system's persistent storage. He may also save the new abstract activity under the previously defined name, but as a new version (e.g., "Hire employee-v.2"). The system also provides a history function, which enables users to access all previous versions of the same abstract activity. Each version of the abstract activity is stored in accordance to the date and time of creation.

If a user wants only to design an abstract activity, he logs off the system after he has finished designing that abstract activity. Usually, though, the user continues by instantiating the newly designed abstract activity into concrete form. As FIG. 4 shows, the illustrated embodiment's abstract-design interface provides a button 422 for this purpose. Clicking on button 422 re-directs the user to a new screen, which displays the concrete-design interface 600 of FIG. 6.

Figure 6:
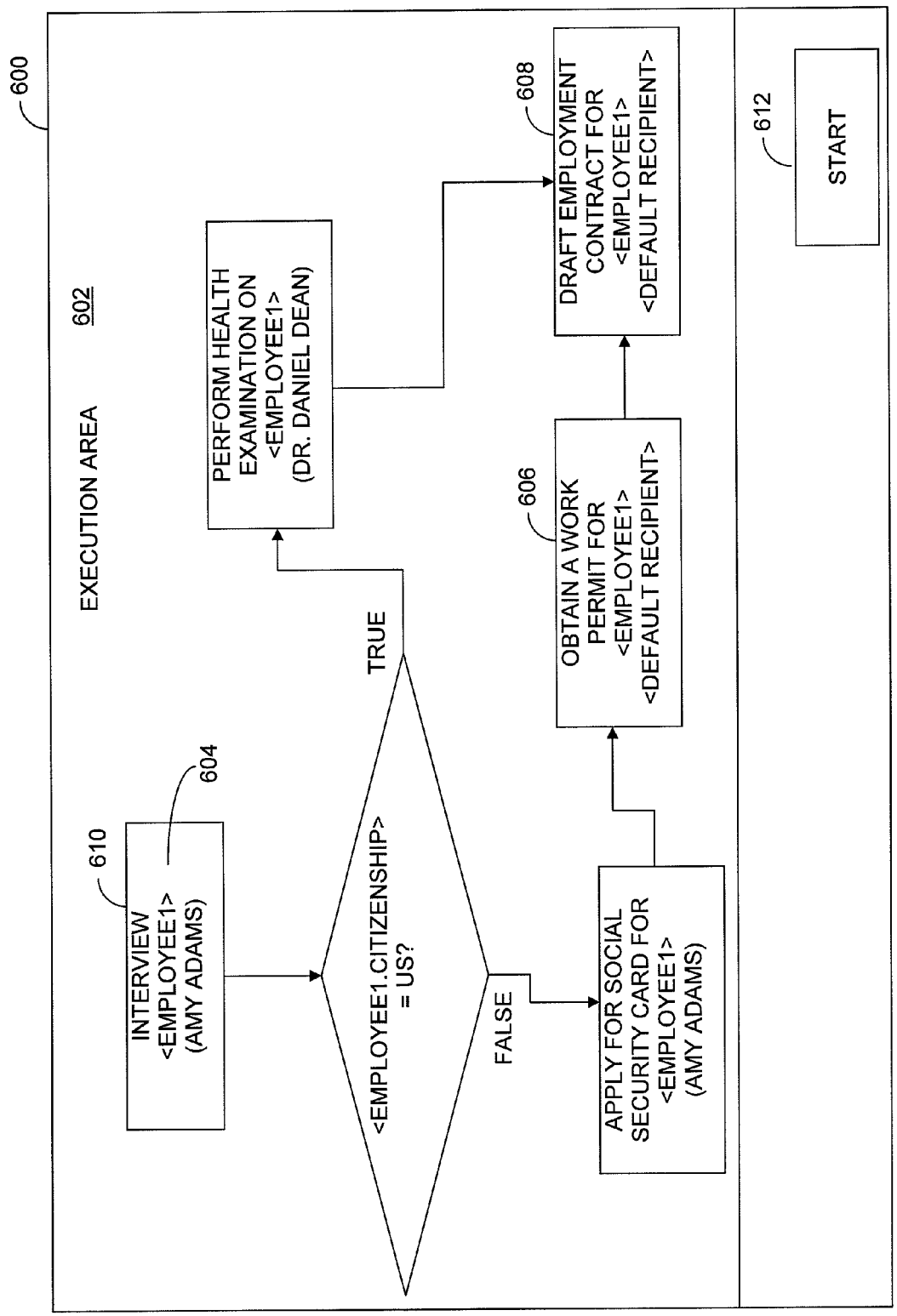
FIG. 6 depicts an exemplary embodiment of a concrete-design interface.

The user employs the concrete-design interface 600 to instantiate the abstract activity by replacing abstract information with concrete information. To replace such abstract information, the user double-clicks on an abstract-information object, such as object 604 (i.e., "<employee1>"). The system responds by producing a blank space in which the user can specify concrete information of that abstract information's data type. In the state that FIG. 6 depicts, the user has not yet entered that concrete information, in the bracketed locations, but he has entered "Amy Adams" and "Lester Lawyer" as the recipients in blocks 606 and 608, where, as FIG. 4 suggests, the abstract-activity designer had provided no default recipients. When the user does provide the concrete information, say, "Ben Brown," for abstract information 604 in block 610, i.e., for "<employee1>," the interface automatically replaces the other boxes' instances of "<employee1>" with "Ben Brown."

As was mentioned above, it is sometimes convenient to think of objects of some data types as rows in a table that corresponds to that data type. When the user replaces the abstract information with concrete information, though, he does not necessarily need to enter values for all of that object's attributes. For one thing, he may specify them by simply identifying an existing table row. For example, if there is already a completely filled row for "Ben Brown" (and if—atypically—the name attribute is that table's unique key attribute), then the user's entering "Ben Brown" is enough to specify all attributes for the concrete information. Even if the table includes no "Ben Brown," though, the system user, for reasons shortly to be explained in connection with the concrete activity's execution, permit the user to start a new row by simply entering "Ben Brown" without entering all attribute values.

As FIG. 6 shows, the illustrated embodiment's concrete-design interface provides a button 612 by which the user can cause the system to start executing the concrete activity. Clicking on that button causes the system to send a prompt to an identified recipient. In the illustrated example, the relationships dictate that the system send the block-610 prompt before all the others, so it sends recipient Amy Adams an "Interview Ben Brown" prompt. The system waits to receive a response confirming the corresponding task's completion before it sends the next prompt.

Note that in the illustrated scenario the concrete activity's further execution requires that the system know the prospective employee's citizenship. That information will typically have been entered, as the value of the Ben Brown object's citizenship attribute, before execution began. As was mentioned above, though, some embodiments may not require all attribute values to be entered initially. It is conceivable in such a case for the concrete activity's execution to be initiated before it is completely defined. This would be acceptable in some circumstances. In the illustrated scenario, for example, the user who specifies that employee1's value is to be "Ben Brown" may not know Ben Brown's citizenship but may cause execution to be initiated anyway. Then the person who responds to the first prompt by interviewing Ben Brown may enter relevant information about him, such as his citizenship, into the database. As a consequence, the information required for further execution is available when it is needed.

Note also that in the illustrated scenario there is no need to obtain the social-security card and the work permit if the employee is a US citizen. In some embodiments, the interface may be arranged to reflect this by, say, eliminating the corresponding boxes from the display as soon as that fact is known.

And the display in such an embodiment may update itself automatically to reflect new information generally. That is, the system may update the display by comparing the parameters for each conditional resolution against the responses received and automatically modifying certain elements of the concrete activity, such as adding or removing a concrete task, changing the order of performance, sending a prompt to a particular recipient, etc. Since the concrete interface 600 is dynamic, these updates are instantly refreshed so that the user can see these updates reflected in the execution area 402 in real time and make decisions for any potential modifications accordingly. In such an embodiment, the system would typically continue updating the concrete interface and sending out prompts until all of the concrete tasks have been completed. Completion of all the concrete tasks indicates a completion of the concrete activity.

In some cases, the prompts contain requests for data for a particular concrete information object, such as "Enter Ben Brown's citizenship." In other embodiments, the prompts contain commands for performing a specific concrete task, such as "Hire Ben Brown." A prompt may be sent through any number of communication media. In some embodiments, the system sends the prompts to each recipient by e-mail or some other electronic messaging system. In other embodiments, each recipient's computing device contains software that causes, say, a message text box to pop up on the recipient's screen to receive from the recipient any information elicited the prompt. Some embodiments may use JXTA technologies and XML (Extensible Mark-up Language) for peer-to-peer communications.

Other modifications and variations will be apparent to those skilled in the art.

What is claimed is:

1. A storage medium containing machine instructions readable by a computer system that includes at least one processor, at least one input device, at least one user interface, at least one network connection, and a data store to configure the computer system as a task manager that:

A) provides to at least one user by means of at least one user interface and/or network connection an abstract-design-phase interface disposed to elicit from said user a definition of an abstract activity, wherein the definition comprises a plurality of abstract tasks and for each said abstract task at least one abstract information element that is associated with said abstract task;

B) receives from at least one user by means of at least one input device, user interface and/or network connection said definition of an abstract activity;

C) stores in the data store the definition of the abstract activity received;

D) provides to at least one user by means of at least one user interface and/or network connection a concrete-design-phase interface disposed to elicit from said user at least one concrete information element related to an abstract information element associated with the abstract activity;

E) receives from at least one user by means of at least one input device, user interface and/or network connection said at least one related concrete information element;

F) creates in at least one processor a concrete instantiation of the abstract activity by replacing at least one abstract information element associated with the abstract activity with said at least one related concrete information element; and G) sends to at least one user by means of at least one user interface and/or network connection instructions to perform a task or instructions to provide information in accordance with the concrete instantiation.

2. The storage medium of claim 1 wherein the concrete-design-phase interface is disposed to elicit user input in selecting a previously defined abstract activity.

3. The storage medium of claim 1 wherein the task manager accepts user input that a user has performed a task in response to the instructions.

4. The storage medium of claim 1 wherein the definition further comprises an abstract relationship that specifies a sequence in which concrete instantiations of at least some said abstract tasks are executed.

5. The storage medium of claim 4 wherein the task manager sends instructions in accordance with the abstract relationship.

6. The storage medium of claim 1 wherein the definition further comprises a conditional resolution that determines, in accordance with a value associated with the a concrete instantiation, whether said concrete instantiation of at least one abstract task is executed.

7. The storage medium of claim 1 wherein the definition further comprises a conditional resolution that determines, in accordance with a value associated with a concrete instantiation, a sequence in which concrete instantiations of at least some said abstract tasks are executed.

8. The storage medium of claim 1 wherein the definition further comprises a conditional resolution that determines, in accordance with a value associated with a concrete instantiation, whether a sequence is imposed upon execution of concrete instantiations of at least some said abstract tasks.

9. The storage medium of claim 1 wherein the abstract-design-phase interface is disposed to:

provide the user a list of previously defined abstract activities; and elicit user input that selects at least one said abstract activity from said list; and the task manager:

receives changes to a selected abstract activity to define a new abstract activity; and stores a definition of the new abstract activity.

10. The storage medium of claim 9 wherein the abstract-design interface is disposed to elicit user input that specifies changes to at least one abstract task associated with the selected abstract activity; and the task manager stores at least one said change.

11. The storage medium of claim 9 wherein the abstract-design interface is disposed to elicit user input that removes at least one abstract task associated with the selected abstract activity; and the task manager stores at least one said removal.

12. The storage medium of claim 9 wherein the abstract-design interface is disposed to elicit user input that specifies changes to at least one abstract information element associated with the selected abstract activity; and the task manager stores at least one said change.

13. The storage medium of claim 9 wherein the abstract-design interface is disposed to elicit user input that removes at least one abstract information element associated with the selected abstract activity; and the task manager stores at least one said removal.

14. The storage medium of claim 9 wherein the abstract-design interface is disposed to elicit user input that specifies changes to at least one conditional resolution associated with the selected abstract activity; and the task manager stores at least one said change;

wherein the conditional resolution evaluates a return value associated with a concrete instantiation and determines whether to add at least one additional abstract task to the concrete instantiation of the abstract activity.

15. The storage medium of claim 9 wherein the abstract-design interface is disposed to elicit user input that removes at least one conditional resolution that is associated with the selected abstract activity and the task manager stores at least one said removal;

wherein the conditional resolution evaluates a return value associated with a concrete instantiation and determines whether to add at least one additional abstract task to the concrete instantiation of the abstract activity.

16. The storage medium of claim 9 wherein the abstract-design interface is disposed to elicit user input that specifies changes to at least one abstract relationship that indicates a sequence in which at least some of the abstract tasks associated with the selected abstract activity are executed, and the task manager stores at least one said change.

17. The storage medium of claim 9 wherein the abstract-design-phase interface is disposed to provide the user a list of previously specified concrete activities and elicit user input that selects a concrete activity from said list and specifies changes to said selected concrete activity to define a new abstract activity.

18. The storage medium of claim 1 wherein the computer system interacts with at least one said user over a wireless communications network.

19. The storage medium of claim 1 wherein the machine instructions configure the computer system to form a peer-to-peer network with other computer systems.

20. The storage medium of claim 1 wherein the abstract-design-phase interface is disposed to elicit user input that assigns an abstract task to a recipient that the task manager thereupon associates with that abstract task.

21. The storage medium of claim 20 wherein the task manager transmits to the said assigned recipient associated with at least one said abstract task instructions for executing a concrete instantiation of that abstract task.

22. A task-managing method, for use with a computer system that includes at least one processor, at least one input device, at least one user interface, at least one network connection, and a data store, comprising:
- A) providing to at least one user by means of at least one user interface and/or network connection an abstract-design-phase interface disposed to elicit from said user a definition of an abstract activity, wherein the definition comprises a plurality of abstract tasks and for each said abstract task at least one abstract information element that is associated with said abstract task;
- B) receiving from at least one user by means of at least one input device, user interface and/or network connection said definition of an abstract activity;
- C) storing in the data store the definition of the abstract activity received;
- D) providing to at least one user by means of at least one user interface and/or network connection a concrete-design-phase interface disposed to elicit from said user at least one concrete information element related to an abstract information element associated with the abstract activity;
- E) receiving from at least one user by means of at least one input device, user interface and/or network connection said at least one related concrete information element;
- F) creating in at least one processor a concrete instantiation of the abstract activity by replacing at least one abstract information element associated with the abstract activity with said at least one related concrete information element; and
- G) sending to at least one user by means of at least one user interface and/or network connection instructions to perform a task or instructions to provide information in accordance with the concrete instantiation.

23. A computer system, that includes at least one processor, at least one input device, at least one user interface, at least one network connection, and a data store, configured as a task manager that:
- A) provides to at least one user by means of at least one user interface and/or network connection an abstract-design-phase interface disposed to elicit from said user a definition of an abstract activity, wherein the definition comprises a plurality of abstract tasks and for each said abstract task at least one abstract information element that is associated with said abstract task;
- B) receives from at least one user by means of at least one input device, user interface and/or network connection said definition of an abstract activity;
- C) stores in the data store the definition of the abstract activity received;
- D) provides to at least one user by means of at least one user interface and/or network connection a concrete-design-phase interface disposed to elicit from said user at least one concrete information element related to an abstract information element associated with the abstract activity;
- E) receives from at least one user by means of at least one input device, user interface and/or network connection said at least one related concrete information element;
- F) creates in at least one processor a concrete instantiation of the abstract activity by replacing at least one abstract information element associated with the abstract activity with said at least one related concrete information element; and
- G) sends to at least one user by means of at least one user interface and/or network connection instructions to perform a task or instructions to provide information in accordance with the concrete instantiation.

24. A storage medium containing machine instructions readable by a computer system that includes at least one processor, at least one input device, at least one user interface, at least one network connection, and a data store to configure the computer system as a task manager that:
- A) provides to at least one user by means of at least one user interface and/or network connection an abstract-design-phase interface disposed to elicit from said user a definition of an abstract activity that includes execution-phase operations and comprises abstract tasks with which are associated abstract information elements that, when replaced with related concrete information elements, define a concrete instantiation of the abstract activity;
- B) receives from at least one user by means of at least one input device, user interface and/or network connection said definition of an abstract activity;
- C) stores in the data store the definition of the abstract activity received;
- D) provides to at least one user by means of at least one user interface and/or network connection a concrete-design-phase interface disposed to elicit from said user at least one concrete information element related to an abstract information element associated with the abstract activity to thereby at least partially specify a concrete instantiation of the said abstract activity;
- E) receives from at least one user by means of at least one input device, user interface and/or network connection said at least one related concrete information element to at least partially specify a concrete instantiation of the said abstract activity; and
- F) based upon the receipt of said at least one related concrete information element, performs at least some of the execution-phase operations of said abstract activity associated with the at least partially specified concrete instantiation.

25. A computer system that includes at least one processor, at least one input device, at least one user interface, at least one network connection, and a data store and is configured as a task manager that:
- A) provides to at least one user by means of at least one user interface and/or network connection an abstract-design-phase interface disposed to elicit from said user a definition of an abstract activity that includes execution-phase operations and comprises abstract tasks with which are associated abstract information elements that, when replaced with related concrete information elements, define a concrete instantiation of the abstract activity;
- B) receives from at least one user by means of at least one input device, user interface and/or network connection said definition of an abstract activity;
- C) stores in the data store the definition of the abstract activity received;
- D) provides to at least one user by means of at least one user interface and/or network connection a concrete-design-phase interface disposed to elicit from said user at least one concrete information element related to an abstract information element associated with the abstract activity to thereby at least partially specify a concrete instantiation of the said abstract activity;
- E) receives from at least one user by means of at least one input device, user interface and/or network connection said at least one related concrete information element to at least partially specify a concrete instantiation of the said abstract activity; and F) based upon the receipt of said at least one related concrete information element, performs at least some of the execution-phase operations of said abstract activity associated with the at least partially specified concrete instantiation.

26. The computer system of claim 25, wherein at least one said execution-phase operation includes sending to a user a prompt specified by at least one concrete information element.

27. A task-managing method for use with a computer system that includes at least one processor, at least one input device, at least one user interface, at least one network connection, and a data store, comprising:

A) providing to at least one user by means of at least one user interface and/or network connection an abstract-design-phase interface disposed to elicit from said user a definition of an abstract activity that includes execution-phase operations and comprises abstract tasks with which are associated abstract information elements that, when replaced with related concrete information elements, define a concrete instantiation of the abstract activity;

B) receiving from at least one user by means of at least one input device, user interface and/or network connection said definition of an abstract activity;

C) storing in the data store the definition of the abstract activity received;

D) providing to at least one user by means of at least one user interface and/or network connection a concrete-design-phase interface disposed to elicit from said user at least one concrete information element related to an abstract information element associated with the abstract activity to thereby at least partially specify a concrete instantiation of the said abstract activity;

E) receiving from at least one user by means of at least one input device, user interface and/or network connection said at least one related concrete information element to at least partially specify a concrete instantiation of the said abstract activity; and F) based upon the receipt of said at least one related concrete information element, performing at least some of the execution-phase operations of said abstract activity associated with the at least partially specified concrete instantiation.

\* \* \* \* \*